Dec. 11, 1928.
W. T. TABB
1,694,725
HEATING APPARATUS
Filed April 28, 1927   2 Sheets-Sheet 1
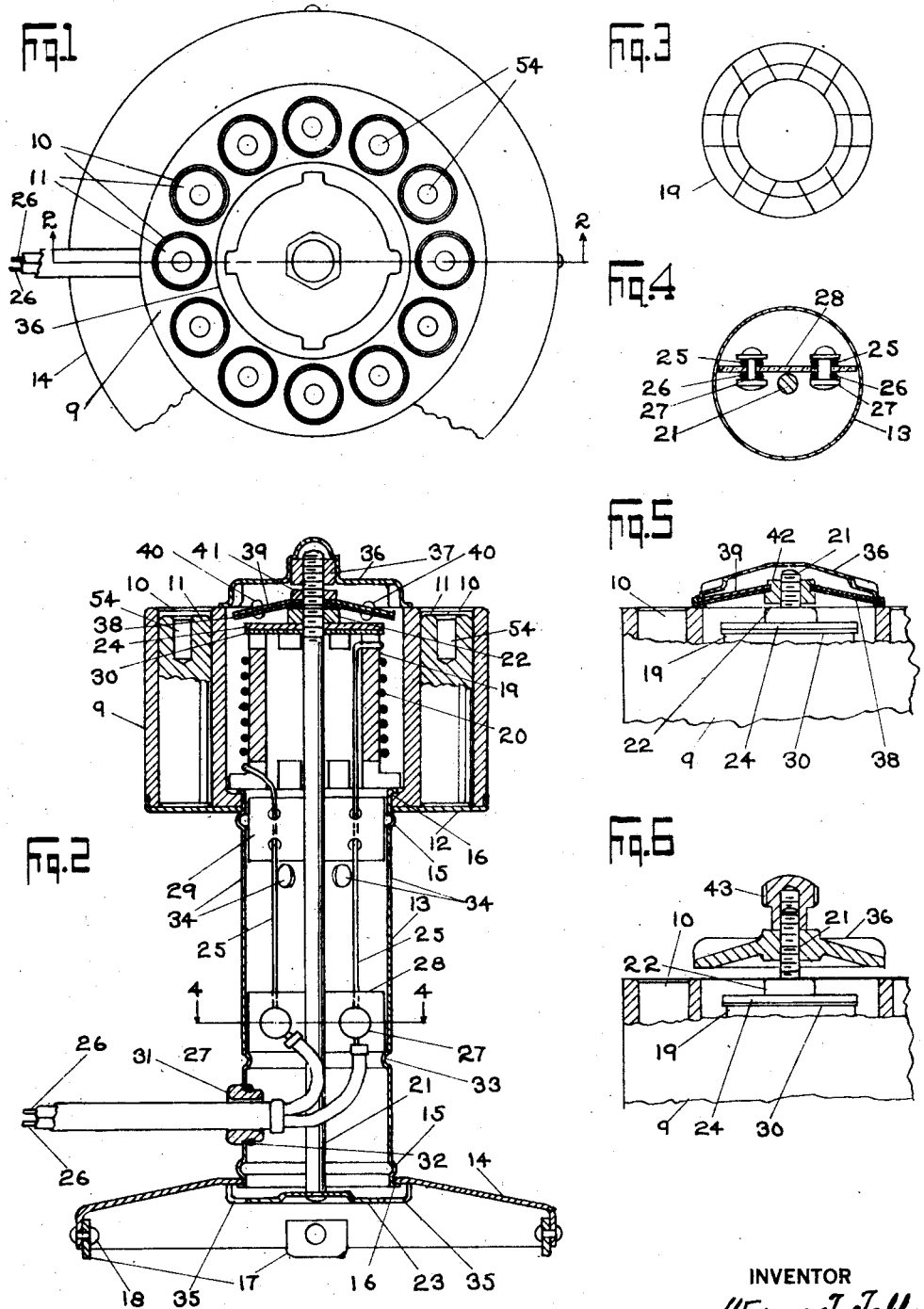
INVENTOR
Warner T. Tabb
BY
himself
as ATTORNEY Dec. 11, 1928.
W. T. TABB
1,694,725
HEATING APPARATUS
Filed April 28, 1927 2 Sheets-Sheet 2
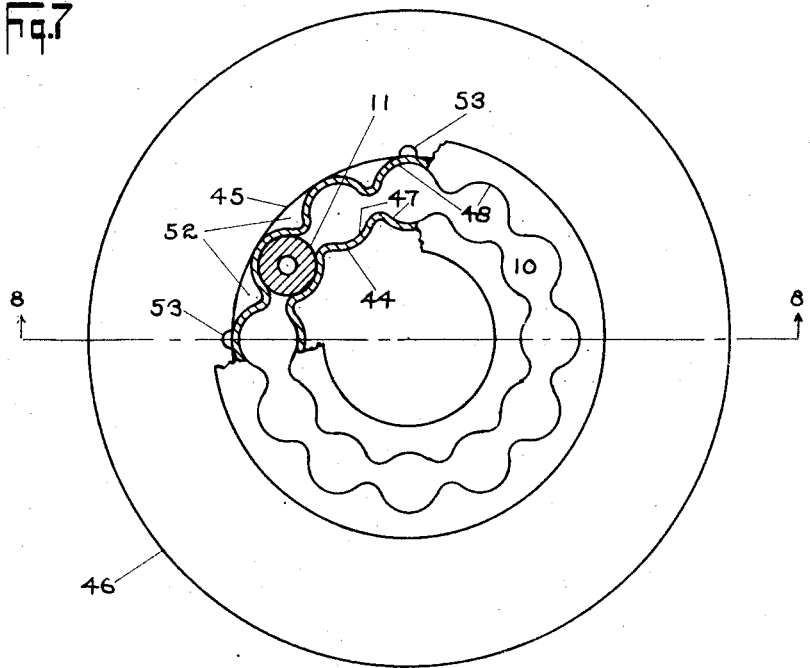
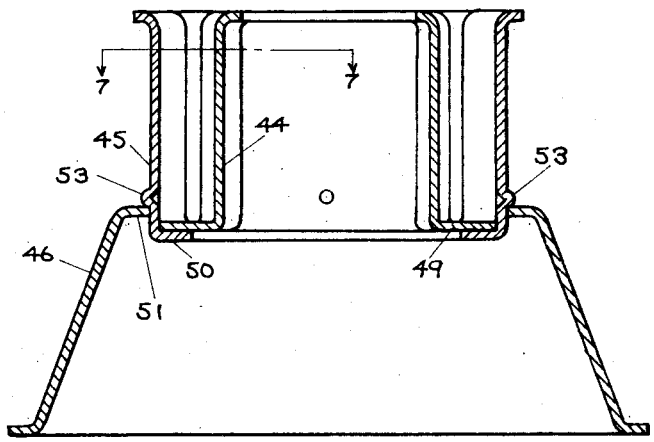
INVENTOR
Warner T. Tabb.
BY himself
ATTORNEY Patented Dec. 11, 1928.

1,694,725

UNITED STATES PATENT OFFICE.

WARNER T. TABB, OF MAHWAH, NEW JERSEY.

HEATING APPARATUS.

Application filed April 28, 1927. Serial No. 187,208.

This invention relates particularly to apparatus for heating insertable cartridges or "heating elements" for hair curlers such as are shown by my application, Serial Numbers 65,838 and 745,316, copending herewith.

An object of this invention is to provide apparatus of this class which will be convenient to use and efficient in its operation.

A particular object is to provide a heating rack for the cartridges referred to above which will place the cartridges in the most advantageous relation for heating and which will facilitate the insertion of the cartridges into the heating rack and their removal therefrom and protect the cartridges from excessive temperatures.

A further purpose is to provide a heat source for such a rack and means to utilize advantageously the heat from such a source or from an independent source.

A further purpose is to provide a convenient method of temperature control for such a heater.

Other purposes of this invention will be made clear by the accompanying drawings and a description which follows.

In the drawings:

Figure 1 is a plan view of a heater according to this invention, with a portion removed.

Figure 2 is a sectional elevation of the heater of Figure 1 and is drawn on 2—2 of Figure 1.

Figure 3 is a plan view of one of the elements of the heater shown by Figures 1 and 2.

Figure 4 shows in detail certain portions of the heater of Figure 2 and is drawn on section 4—4 of Figure 2.

Figure 5 shows in partial section portions of a heater similar to that of Figure 2 but differing in some respects therefrom.

Figure 6 shows in partial section portions of a heater different in some respects from Figure 5 and Figure 2.

Figure 7 shows in plan view an alternate form of this invention, in partial section on 7—7 of Figure 8.

Figure 8 shows the form of Figure 7 in sectional elevation on 8—8 of Figure 7.

Cartridges to be heated are included in Figures 1 and 2. One such cartridge is shown in position also in Figure 7.

Referring in the first place to the heater of Figures 1, 2, 3, and 4, a heater rack 9 is shown having substantially the form of a cylindrical shell with a plurality of recesses 10 therein extending longitudinally thereof. The recesses 10 are of suitable shape to receive cylindrical cartridges 11 which are positioned adjacent the mid periphery of the rack 9 in substantially symmetrical formation.

The recesses 10 are shown as extending through the rack 9 and are closed at their lower ends by the rack plate 12. The rack and plate are supported by the tubular pedestal 13, and the latter in turn by the base 14. Rigid attachment of the pedestal 13 to the rack 9 and the plate 12 is accomplished by means of the outwardly extending rolled grooves 15 with the flanged ends 16 which provides substantially riveted joints. The base 14 has feet 17 attached thereto by the rivets 18. The feet 17 are preferably made of thermally nonconductive material to insulate more effectively the heater from a table on which it may be placed.

Within the rack 9 and substantially central thereof is positioned a core 19 having an electrical resistance winding 20 thereon. The core 19 is positioned by the outwardly extending flange thereof and is held downward in relation to the inwardly extending flange of the rack 9 by the rod 21 and the nut 22 in combination with the base plate 23 and the core plate 24.

The resistance winding 20 has terminal wires 25 extended longitudinally within the pedestal 13 and electrically connected to the cord 26 by the rivets 27, as shown most clearly by Figure 4. The connected ends of the cord 26 and the terminal wires 25 are electrically insulated from each other and from the pedestal 13 and the rod 21 by the terminal plate 28. The terminal wires 25 are further positioned and insulated by the spacer plate 29. The terminal plate 28 and the spacer plate 29 may be constructed of mica or other suitable insulating material reasonably resistant to heat. The insulating disk 30 protects the core plate 24 from contact with the terminal wires adjacent thereto. The cord 26 is carried outwardly of the pedestal 13 through an opening therein adjacent the base 14, and is electrically insulated from the pedestal 13 by the ferrule 31. The ferrule 31 is retained by the spring ring 32 which is partially recessed into the ferrule. Undue strain on the terminal wires 25 is prevented by the rolled groove 33 of the pedestal.

The pedestal 13 and the base plate 23 are provided with apertures 34 and 35 respectively which permit circulation of air in the pedestal 13 to prevent undue heating of the base 14 and the cord 26.

The core 19 has slots in the ends thereof, radially extending and permitting the passage of air from the pedestal 13 to the inner peripheral surfaces of the core 19 and the rack 9 and to the outer surface of the winding 20. Circulation of air past these surfaces is limited by the cover 36 which in the position of Figure 2 effectively closes the inner chamber of the rack 9 at its upper end. The cover 36 however is carried by the nut 37 and is thus adjustable with respect to the rack 9 by rotation of the nut 37. To facilitate such rotation the nut 37 has a hexagonal formation and the boss of the cover 36 into which the nut 37 is recessed has a similar shape, and ribs are provided adjacent the outer periphery of the cover 36 to be engaged by a suitable instrument for rotating the cover when hot. The nut 37 fits loosely into the boss of the cover 36 so that the cover 36 is longitudinally movable with respect to the nut and may likewise be removed therefrom to uncover the inner chamber of the rack 9. By these means the circulation of air through the inner chamber of the rack is manually controllable to regulate the rate of heating or of cooling of the rack.

As a protection against accidental overheating of the rack 9 a thermostat is provided comprising the elements 38 and 39 joined by the rivets 40 and retained by the nut 41. The elements 38 and 39 are constructed of metallic materials having different coefficients of thermal expansion. The elements 38 and 39 are shown in formation corresponding to normal temperatures existing when the heater is inoperative. When the current is passed through the winding 20 and the temperature of the rack and the inner chamber thereof increases, the element 38 expands more rapidly than does the element 39 and the elements are warped from the formation shown, the outer portions of the element 39 being moved upward towards the under surface of the cover 36. The thermostat will therefore lift the cover from its manually determined position if the temperature rises sufficiently.

The cover 36 may be thus adjusted independent of the thermostat to a position to give the desired rate of heating, but in all positions within the range of the thermostat the cover is subject to the action of the thermostat if the temperature of the latter exceeds a predetermined value.

A somewhat different arrangement is shown by Figure 5 in which the cover 36 is carried by the thermostat 38—39 while the location of the thermostat itself is adjustable by means of the nut 42 to which the thermostat is attached. The cover is thus always within the range of action of the thermostat.

The elements 38 and 39 are rigidly attached to the cover 36 and the nut 37 by crimped joints as shown.

Figure 6 shows a cover 36 adjustably mounted on the rod 21 and adapted to be locked in any desired position by means of the knurled nut 43, with no provision for thermostatic control.

The heater of Figures 1 and 2 is so constructed that the electrical heating means may be easily removed. By removing the nuts 22, 37 and 41, the rod 21 and the base plate 23 may be withdrawn from the bottom of the heater. The core 19 with its winding 20 and terminal wires 25, the terminal plate 28 and the spacer plate 29 may then be withdrawn through the upper end of the rack 9, the cord 26 being at the same time drawn inward through the ferrule 31 and upward through the pedestal and rack without being disconnected from the terminal wires 25. The heater will then consist essentially of the rack 9, the rack plate 12, the pedestal 13, and the base 14; and in this form the heater may be used with a gas burner of an ordinary kitchen range, or otherwise the electrical heating arrangements may be replaced by a Bunsen gas burner of the vertical tube type with the tube of the burner internal of the pedestal 13.

A simple form of heater especially suited to use with the gas burner of the kitchen range is shown by Figures 7 and 8. In this case the rack 44—45 is directly supported by the hood 46 which replaces the pedestal 13 and the base 14 of Figure 2. The rack 44—45 is constructed of drawn sheet metal and comprises an inner shell 44 and an outer shell 45. The shells 44 and 45 have cooperating flutes 47 and 48 respectively which provide recesses 10 similar in effect to those of the rack 9 of Figures 1 and 2, to receive and position cartridges as shown at 11 of Figure 7. The outwardly projecting lower flange 49 of the shell 44 is supported by the inwardly projecting flange 50 of the shell 45. The flange 49 is shaped at its outer periphery to conform to the inner surface of the shell 45 and by this means the shells 44 and 45 are maintained in correct angular relation to each other. The circular inner periphery of the inwardly projecting flange 51 of the hood 46 provides in combination with the fluted outer surface of the shell 45, apertures 52 which permit the flame or hot gases from a gas burner under the hood 46 to pass upward adjacent the outer surface of the shell 45 as well as adjacent the inner surface of the shell 44. The extruded knobs 53 provide support for the shell 45 by the hood 46. The hood 46 by reason of its truncated cone formation will direct the hot gases from a gas burner positioned thereunder to the rack 44—45, and the fluted formation of the rack is adapted to utilize the heat from such a burner to the best advantage.

The cartridges shown in Figures 1, 2, 7, and 8 have cylindrical recesses to accommodate an expansible instrument for withdrawing the cartridges from the heater, such an instrument as is shown by Figure 6 of my copending application, Serial Number 745,316.

Having thus described my invention, that which I claim and for which I ask Letters Patent of the United States, is:—

1. A heating device comprising a tubular shell and longitudinally extending cylindrical recesses in the wall of said shell, said recesses being open at one end and otherwise substantially closed, and a tubular pedestal for said shell and a base for said pedestal and a heating means for said shell centrally positioned therein, and supply connections for said means internal of said pedestal.

2. A heating device for hair curler rods, comprising a central heating chamber and a source of heat centrally positioned within said chamber; and a multiplicity of receptacles for said rods positioned outside said chamber and said source, positioning said rods in substantially parallel and symmetrical formation adjacent said chamber and substantially equi-distant from said source.

3. A heating device for hair curler rods, comprising a rack of substantially cylindrical shell formation with a central heating chamber formed by the inner surface of said shell; and a multiplicity of longitudinally elongated recesses for said rack formed in the wall of said shell, with open mouths at one end of said shell but effectively closed from the inner and outer cylindrical surfaces of said shell.

4. In heating apparatus a body to be heated and a pedestal for said body and a ventilating passage through said body and said pedestal, and an electrical resistance heating element positioned in said passage, and adjustable closing means for said passage; said means comprising a threaded rod longitudinally extending in said passage, and a cover supported by said rod and longitudinally adjustable with respect to said body by means of said thread.

In witness whereof I have affixed my signature this 26th day of April, 1927.

WARNER T. TABB.